United States Patent

Braun et al.

[15] 3,635,788

[45] Jan. 18, 1972

[54] DEINKING AND REMOVAL OF CERTAIN CONTAMINANTS FROM RECLAIMED PAPER STOCK-HEAVYING

[72] Inventors: Harry J. Braun, 923 Carolina Street, Neenah, Wis. 54956; Stanley A. Dunn, 310 Plympton Street, Verona, Wis. 53593

[22] Filed: Jan. 22, 1971

[21] Appl. No.: 108,834

[52] U.S. Cl. .................................162/4, 162/55, 209/211, 210/84
[51] Int. Cl. ....................D21b 1/08, D21b 1/32, D21c 5/02
[58] Field of Search ...........................162/4–8, 55; 209/211; 210/84

[56] References Cited

UNITED STATES PATENTS

| | | | |
|---|---|---|---|
| 3,486,619 | 12/1969 | Grundelius et al. | 209/211 |
| 3,085,927 | 4/1963 | Pesch | 162/55 |
| 1,707,604 | 4/1929 | Fisher | 162/5 |

Primary Examiner—Howard R. Caine
Attorney—Littlepage, Quaintance, Wray & Aisenberg

[57] ABSTRACT

In centrifugal cleaning and deinking of reclaimed defibered paper stock, a material is introduced into a slurry of the stock, which contains certain contaminants of about the same specific gravity as the fibers, so as to treat those contaminants selectively and cause them to assume the characteristics of heavier solids so that they are retained in the outer part of the vortex of the cleaner while the fibers migrate to the inner part of the vortex.

15 Claims, 1 Drawing Figure

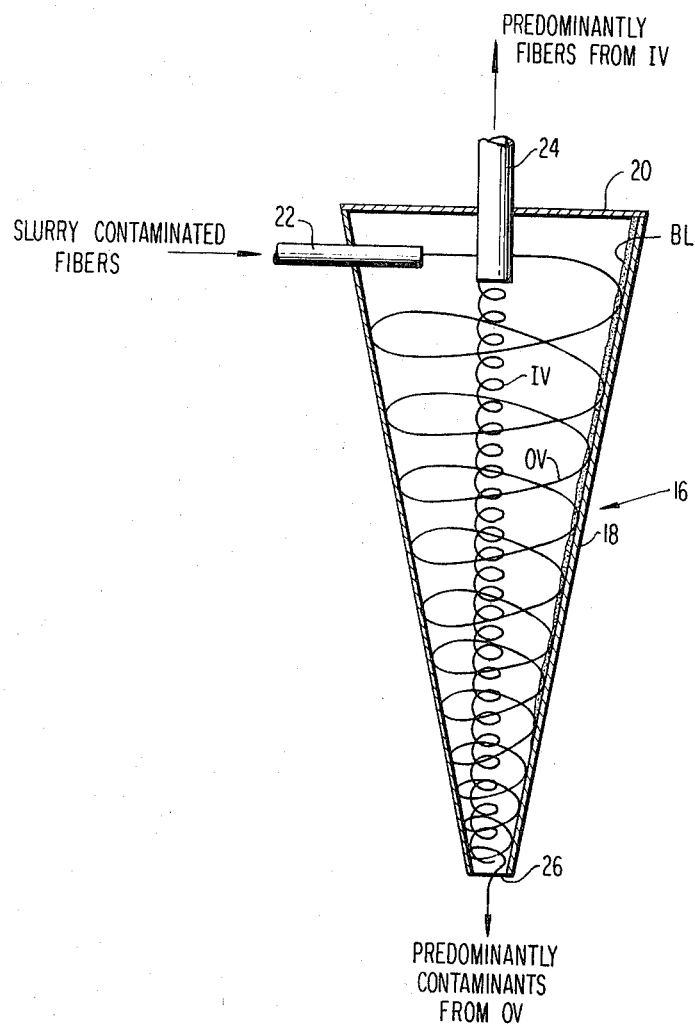

DEINKING AND REMOVAL OF CERTAIN CONTAMINANTS FROM RECLAIMED PAPER STOCK-HEAVYING

RELATED APPLICATIONS

REVERSE CLEANING AND DEINKING OF RECLAIMED PAPER STOCK Harry J. Braun, Ser. No. 830,395, filed June 4, 1969; DEINKING AND REMOVAL OF CERTAIN CONTAMINANTS FROM RECLAIMED PAPER STOCK Harry J. Braun and Stanley A. Dunn, Ser. No. 6,468, filed Jan. 26, 1970 now Pat. No. 8,557,956.

PRIOR ART In normal deinking and cleaning of reclaimed paper stock, after the raw material has been defibered and deinked by conventional treatments in the presence of alkali, dispersants and solvents followed by washing, bleaching, if used, and fine screening, a stock slurry of about 0.5 percent (by weight of solids based on total slurry weight) consistency in water is fed at about 45 p.s.i.g. into a centrifugal cleaner. The centrifugal cleaner is generally a conical or cylindrical and conical device having a tangential input pipe in the top and axial outlet nozzles at the top and bottom. The slurry forms a vortex which has an outer downwardly spiraling portion and an inner upwardly spiraling portion. The flow or slurry splits are controlled primarily by the relative sizes of the outlet nozzles. Generally speaking, the solids which have specific gravities close to or slightly less than that of water are retained in the inner portion of the vortex (hereinafter "inner vortex" or IV) and exhausted through the top nozzle. This portion of the slurry includes most of the fibers, which range in specific gravity from about 0.98 to 1.40 and the so-called "low density" contaminants, i.e., those with specific gravities of 1.0 and less. The so-called "high density" contaminants, i.e., those with specific gravities of about 1.40 and above, migrate to the outer portion of the vortex (OV) and are exhausted through the bottom nozzle. Contaminants with specific densities similar to fiber can go to either portion of the vortex.

The problem with conventional operation of the cleaners is twofold. First, with the increased use of rubbery and synthetic resin bindings, backings and coatings for paper, those materials which are considered to be contaminants find their way into the waste paper stock, and they are difficult and often impossible to remove by conventional methods of deinking. When they, along with the fibers, reach the centrifugal cleaner, they, generally having specific gravities less than water, are retained in the inner vortex and are exhausted through the top nozzle along with the fiber "accepts."

SUMMARY OF THE INVENTION

Effective as normal centricleaning has proven to be, there is a special class of contaminants of density near that of the medium which, having insufficient or no impetus to proceed to the outer vortex, remain largely in the inner vortex from which they are exhausted along with "low density" contaminants and fiber accepts. This special class is composed of solids with densities close to that of water, i.e., about 0.96 to 1.04 and ranging from slightly less than 0.96 up to 1.1, and being of plastic, polymeric adhesive, rubbery and asphaltic material.

By incorporating in the slurry input to the centricleaner a "-heavying" agent which selectively acts upon said special class of solid contaminants, they are removed with heavier contaminants through the bottom nozzle rather than with the accepts through the top nozzle. The heavying agent is an essentially nonpolar hydrophobic material which is preferably liquid having a density greater than that of water.

It is thus an object of this invention to improve normal centrifugal cleaning of a slurry of reclaimed defibered paper stock. A further object is to act upon certain contaminants so that they are exhausted with heavy rejects rather than with fiber accepts. A still further object is to increase the effective density of said contaminants selectively so that they migrate to and/or are retained in the outer vortex of the centrifugal cleaner while the fibers continue to exhaust from the inner vortex through the upper nozzle.

These and other objects will be apparent from the following specification.

DESCRIPTION OF THE DRAWING

The sole FIGURE is a diagrammatic showing of apparatus used for practicing the subject process.

DETAILS

With reference to the drawing, centrifugal cleaner 16 is, e.g., a standard 3-inch cleaner manufactured by Bauer Brothers, well known to those skilled in this art. Other suitable types are manufactured by Bird Machinery Company, Nichols Engineering, and others. Centrifugal cleaner 16 has a conical sidewall 18, a closed top 20, a tangential infeed pipe 22 near the top, a top nozzle 24 located axially in the base and a bottom nozzle 26 at the apex of cone 18. The slurry input forms a vortex having an outer downwardly spiraling portion OV and an inner upwardly spiraling portion IV. The slurry forms a thin boundary layer BL along the inner side of wall 18. A central upwardly moving column of air enters through the bottom nozzle 26 and is educted through top nozzle 24. Part of the slurry, from the outer vortex OV, containing whatever solids have migrated thereto, is exhausted through bottom nozzle 26, and the remainder of the slurry from the inner vortex IV, containing whatever solids have remained therein, is exhausted through top nozzle 24. The relative sizes of the top and bottom nozzles, for a given slurry infeed pressure, determine the slurry and solids splits. This type of centrifugal cleaner is usually operated with a slurry of 0.5 percent (by weight) consistency, 45 p.s.i.g. infeed pressure, 5/8-inch top nozzle, 1/8-inch underflow nozzle and a flow split of 96.57 percent (by weight) overflow and 3.43 percent (by weight) underflow. In this operation, 84.82 percent (by weight) of the fibers passing through intake 22 are taken out with the overflow through the top nozzle as accepts, but along with them come some of the contaminants of the special class, i.e., solids with specific gravities near unity, as well as most of the "light" contaminants and some of the contaminants with specific gravities greater than that of the fibers but which are retained in the inner vortex because their minute size, or size and shape give them relatively higher hydraulic drag coefficients.

We have found ways to increase particle size and specific gravity and thereby "heavy," i.e., increase the radially outward settling velocity of, contaminants, permitting their more ready separation by normal centrifugation. "Heavying" is achieved with a high density material which preferentially wets onto and/or absorbs into contaminant particles. The density of the heavying material should be greater than that of the contaminant and that of the suspending medium, essentially water, for most practical consideration. It may then function in three ways:

1. By increasing the overall density of the contaminant—fluid composite particulate (i.e., particle and absorbed and/or wetting "heavying" material);
2. By increasing the volume of the particulate, by its own volume, so that it settles more rapidly in a gravitational field and
3. By agglomerating contaminant particulates.

If the densities of the fluid, i.e., the additive to induce the heavying effect, and the contaminants are the same and both greater than that of the water, there will still be a heavying effect due to effects Nos. 2 and 3. In a typical deinking operation, such as outlined in part in the formal examples, where 1/32-inch square by 0.003-inch thick polyamide sheets of specific gravity 1.1 are used as contaminant and chlorobenzene (specific gravity = 1.1), the additive (about a third by weight of the contaminant), the contaminant level in the accepts is about 50 percent that obtained when the chlorobenzene is omitted.

If the density of the contaminant is greater than that of the water and that of the additive material is intermediate, the effect No. 1 of density will be in opposition to the heavying effects 2 and 3. With large amounts of additive material, particles can be made "lighter" (i.e., decreased radially outward settling velocity) than they originally were. With a small amount, they may still be "heavied" by virtue of agglomeration. In tests similar to those of the previous paragraph where the additive, 2-furylacetonitrile, having a density (specific gravity = 1.085) intermediate those of water and of the polyamide, is added after washing, the contaminant level in the accepts is about 55 percent that obtained when the 2-furylacetonitrile is omitted.

Similarly, if the density of the contaminant is greater than that of the water but that the additive material is equal to or less than that of the water, it is possible to achieve a heavying effect through agglomeration. With decreasing density of the additive material below that of the medium, smaller proportions can be tolerated in achieving agglomeration on account of the adverse effect of additive density. In tests similar to those of the two previous paragraphs where the additive is 1-chloroheptane (specific gravity = 0.87), the contaminant lever in the accepts is 85 percent of that obtained when the 1-chloroheptane is omitted.

With contaminant of density equal to that of the water an additive material of greater density will achieve heavying by all three aforesaid mechanisms in all proportions. In tests similar to those of the preceding paragraphs where the contaminant is ethylene/vinyl chloride copolymer (specific gravity= 1.0) instead of polyamide and the additive is 4-bromo-m-xylene (specific gravity = 1.3), the contaminant lever in the accepts is 40 percent that obtained when the additive is omitted.

It is even possible to produce "heavying" of particles of density less than that of the medium. In this case the additive material density must be greater than that of the contaminant but preferably also greater than that of water. It must be greater than that value which corresponds to two-thirds of the density interval extending from that of the contaminant to that of water, as computed for spherical particles. An additive material whose density is intermediate between those of the contaminant and medium and fulfills this condition will tend to heavy the contaminant by effect No. 1 above. In tests similar to those of the preceding paragraphs the contaminant is of polyethylene (specific gravity = 0.95) and the additive is m-tolunitrile (specific gravity = 0.986). When the amount of the additive is initially above 10 percent (by weight) that of the contaminant, the contaminant lever of the accepts is about 80 percent that obtained when the additive is omitted. When the amount of additive is initially about equal to that of the contaminant by weight, the contaminant level of the accepts is about 120 percent that obtained when the additive is omitted. As the portion of fluid increases, this effect will slacken; effects 2 and 3 which are in opposition to it will first equal it and then proceed to make the composite particle(s) "lighter."

The point of equal opposition between No. 1 and No. 2 is readily determined from the densities and proportions involved by Stokes Law. As will be seen below, effect No. 3, though similar in nature to No. 2, may be far stronger, i.e., operable at lower concentrations of additive.

Even with an additive material with a density greater than that of water effect No. 3, that of agglomeration, opposes and can overbalance effect No. 1 of the additive material until sufficient of the material has been added to bring the composite density of additive and contaminant up above that of the medium. Effect No. 2 cannot do this.

Since the additive material must preferentially wet and/or absorb into the contaminant, it is helpful to characterize the nature of not only the contaminant, but also the medium and associated materials, in order to define the properties required of the additive material.

In the paper deinking industry the medium consists of water containing the very hydrophilic or polar substance, pulp. It may, in addition, contain other very hydrophilic substances, such as salts, clays and other inorganic pigments. Thus, in order to preclude any degree of wetting of pulp, the additive material should be essentially nonpolar or hydrophobic. Fortunately, most of the near neutral density contaminants, i.e., those with densities near that of the medium, water, remaining after alkaline hydrapulping, are also nonpolar and hydrophobic and thus are readily distinguishable on this basis from pulp.

As a class, the halogenated hydrocarbons are admirably suited to the "heavying" of the nonpolar hydrophobic contaminants just mentioned; the cyano group is included along with the regular members of the halogen series. Excluded are those types, such as acylhalides, which are reactive with water. Oxygen in the more inert forms, such as in ether linkages, is acceptable. The more polar hydrophilic acid and alcohol groups can be tolerated to only a limited extent as they may make the additive material substantive for wetting of pulp and other hydrophilic materials. Either aliphatic or aromatic hydrocarbons are suitable. The additive material may be either mono- or polyhalogenated, the latter in general being preferable. It may be either liquid or solid, but generally better results are obtained with the lower molecular weight materials, e.g., those having a molecular weight below about 1,000, other considerations being equal.

The heavying additives or agents according to this invention encompass a large variety of aliphatic, aromatic, cycloaliphatic and heterocyclic compounds which are effectively nonreactive with water, i.e., virtually free from poly hydrophilic groups, such as acid and alcohol groups. The compounds can be hydrocarbons or substituted hydrocarbons; carbon chains can be interrupted by hetero atoms, such as oxygen and nitrogen atoms. Heavying agents can be either solids, such as tetrachloro-o-xylene dichloride (TCXD) and hexachlorobenzene, or liquids, such as monochlorobenzene and m-bromotoluene, but liquid heavying agents are preferred. They can be individually employed or used in any combination of two or more as long as no reaction occurs between them.

As seen from the preceding exemplifications, both mono- and polyhalogenated hydrocarbons are contemplated. The halogen can be chlorine, bromine, iodine or fluorine. Moreover, different halogens can be present in the same heavying agent, such as in 1-bromo-3-chlorobenzene and in 1-chloro-5-bromopentane.

The heavying agent can contain oxygen in ether form, such as in bis-(3-chloro)dipropylether. Although polar hydrophilic groups are to be avoided, they are not completely excluded. Illustrative heavying agents with carboxylic acid groups include o-chlorobenzoic acid and m-bromobenzoic acid; suitable alcohols are 5,7,9-trichlorododecanol-2 and 3-(p-bromophenyl)propanol.

The heavying agent may be cyano-substituted, such as in $\Delta$-bromocapronitrile and in $\alpha$-methyl-$\beta$(o-chlorophenyl)propionitrile. Aliphatic heaving agents include both saturated compounds, such as 1,3-dichloro- 2,2,4-trimethylpentane and 7-bromo-4-chloro-3-isopropylheptane, and ethylenically unsaturated compounds, such as 9-iodo-1,5-nonadiene. Cyclohexane is a hydrocarbon which is also illustrative of suitable cycloalkanes.

Aromatic heaving agents can also be hydrocarbons, e.g., 1,4-dimethylnaphthalene; then can be mononuclear, e.g., iodobenzene, dinuclear, e.g., $\alpha$-methoxynaphthalene, 4,4'-dichlorodiphenyl and 1,2-dichloronaphthalene, or polynuclear, e.g., 2-chlorophenanthrene.

Exemplary heterocyclic heavying agents are those, e.g., in which there is one or more ring oxygen and/or nitrogen atoms, such as trichloro-oxazole and 3-bromopyridine; the heterocycle can be mononuclear, e.g., 2,3,4-trichlorofuran, of dinuclear, e.g., 6-chloroindole.

As noted in the preceding discussion, the manner in which the heavying agent functions is of the essence. The specific gravity of the heavying agent is also a significant factor.

These materials all have the property of being able to adsorb onto the contaminant surface, or in other words, to wet the contaminant in the case of the liquids. In terms of contact angle, the contact angle of water in air on the so-called nonsaponifiable low density plastic materials is usually in the vicinity of 90° while the interfacial angle between water and a typical liquid member of the above group of additive materials on such a plastic approaches 180° (measured through the water). By contrast, the contact angle of water on pulp in the presence of a liquid member of the above class of additive materials is virtually zero degrees. These adsorbing and wetting characteristics are sufficient to account for the capability of these additive materials, causing contaminant particulates to agglomerate.

Halogen substitution in a hydrocarbon progressively increases its density. The densities of hydrocarbons in general start from below and in the vicinity of unit specific gravity in the unsubstituted state and invariably increase with each halogen atom substituted, one or two such substitutions usually being sufficient to bring the density of the lower molecular weight hydrocarbons (having unsubstituted molecular weight below 200) above the specific gravity of water. As is well known to those skilled in the art, the increase in density per halogen atom substituted is also a function of the identity of the halogen atom and increases in the order fluorine, chlorine, bromine, iodine.

In addition to their ability to adsorb and/or wet the surface of the nonsaponifiable plastics, these halocarbons also exhibit a tendency to swell or be absorbed by this class of plastics as well as most plastics, the degree of absorption varying with the nature of the halocarbon and the nature of the plastic. Swelling ability generally improves with decrease in molecular weight of the parent hydrocarbon, with increasing degree of substitution and with increasing proportion of aromatic, as opposed to aliphatic, nature of the original or parent hydrocarbon.

Surface and swelling properties of the halogenated hydrocarbon additives with respect to ink particulates was not known. It is therefore surprising to find that plastic materials which have been swollen with halogenated additive materials have a tendency to pick up ink particulates and, furthermore, the degree of pickup appears to be related to the degree, i.e., weight percentage, of swelling of the plastic by the halogenated additive material. When the degree of carbon black pickup is measured by the amount of light reflected by absorbed particles from a beam of light of known intensity, the log of the ratio of incident to reflected light is approximately proportional to the weight percent of various halogenated additive materials, such as TCXD and Arochlor-1260, absorbed by the plastic.

When incorporating a heavying agent into centrifugal cleaner feed of aqueous reclaimed paper stock slurry, it is essential only that sufficient heavying agent be added to obtain the desired result of effectively increasing the specific gravity of contaminants, such as plastic, polymeric, adhesive, rubbery or asphaltic contaminants, normally discharged with accepts (removed at the base from the axis of, e.g., a conical centricleaner with the relatively light fibers) so that these contaminants will be discharged with heavier rejects (removed, e.g., from the apex of a conical centricleaner). An excess of heavying agent is avoided from an economic standpoint. Moreover, an excess can have a purpose-defeating result and thus nullify the desired heavying effect. Ordinarily, from 5 parts per million (p.p.m.) to 10 p.p.m. (by weight) of heavying agent (based on the total aqueous reclaimed paper stock slurry weight) are suitable.

In view of the pronounced tendency of these halogenated hydrocarbons to cover the typical nonsaponifiable low density contaminants, it is understandable that little more than a monolayer is needed to foster agglomeration among contaminant particles, at least among the liquid members of the class of additive materials. The decrease in hydrodynamic drag coefficient due to this effect is thus far sooner felt than a similar decrease due to swelling or increase in particle volume, resulting from the volume of the additive material taken into the plastic.

A typical plastic contaminant, a 67/33 copolymer of ethylene and vinyl acetate (du Pont's "Elvax 150"), was formed into 3/4 inch square sheets, each weighting approximately 15 milligrams. These were placed in test tubes, together with about 10 milliliters (ml.) of distilled water and one or two grams of halogenated hydrocarbon, e.g., each of these enumerated in the following paragraph. The open test tubes were heated to 100° C. for 30 minutes, and the densities of the samples were then compared with that of water.

In the case of each, in the following list of candidate additive material, the density of the plastic sample was raised from its initial value of 0.96 grams/cc. to a value in excess of one, as attested by the fact that it readily sank in water:

monochlorobenzene
ortho-dichlorobenzene
para-dichlorobenzene
tetrachloroorthoxylene dichloride (TCXD)
"Arochlor 1260" (the Monsanto trade name for a polychlorodiphenyl)
"Arochlor 1270" (the Monsanto trade name for polychlorodiphenyl)
"Chlorowax 40" (Diamond Alkali's trade name for $C_{24}H_{43}CB\&Q$)
"Chlorowax 70" (Diamond Alkali's trade name for $C_{24}H_{29}CB\&LK$) 1,2,3-trichloropropane
1,1,2,2-tetrabromoethane Plastics with a simple saturated aliphatic hydrocarbon type structure are more difficult to cause to swell than plastics which contain some oxygen or chlorine linkages. Furthermore, of two simple hydrocarbon polyethylenes, the one with the higher melt index is more easily swollen than the other. For these reasons, a low melt index polyethylene is virtually an ideal prototype plastic contaminant upon which to test the efficacy of various halogenated hydrocarbon candidates for the additive material which would cause "heavying".

"Heavying" by this technique proceeds under conditions more closely resembling possible plant practice. Placing a 15 mg. 3/4 inch square sample of low melt index polyethylene (Bakelite Division of Union Carbide's DYNJ grade, melt index 1.0 to 0.5 gram/10 minutes at 190° C. as per ASTM D1238 —52T; viscosity at 190° C.=13 ×10$^4$ poise) in a 6 percent (by weight of solids based on the total weight of aqueous slurry) consistency pulp slurry in water containing 0.05 percent (by weight) of candidate additive material, heated to 85° C. for 20 minutes with agitation and examined for weight and density increase, results in a 60 percent weight increase of the plastic (corresponding to a polyethylene density of 1.12 grams/cc.) when the additive is TCXD. When "Arochlor 1260" is the additive material, the plastic swells to the extent of a 17 percent weight increase, corresponding to a density of 1.0. The initial density of the low melt index polyethylene prototype plastic is 0.93 grams/cc.

Swelling is a surface phenomenon. Samples subjected to the action of the additive material at the surface of the aqueous phase usually swell to a greater degree or more rapidly than those submerged below the surface of the aqueous phase. Furthermore, surface active agents, either cationic, anionic or nonionic, exhibit a negligible effect on the swelling of submerged samples, but markedly reduce the enhanced swelling of surface samples to values resembling those of the swollen submerged samples. This suggests of course, that the pulp slurry, to be deinked by this technique, should be exposed to air over large surfaces generated either by flow over shallow weirs, spillways or trays or by suitable mechanical agitation or bubbling of air through the slurry. The effect of surface factors on swelling is reflected in table 1.

TABLE 1.—SWELLING POLYETHYLENE WITH TCXD IN AQUEOUS MEDIA

[Weight percent increase]

| Sample pretreatment | Sample position | None (blank) | Surfactant Nonionic (Ethomid RC/60) | Cationic (Arquad 2HT) | Anionic Ivory soap | Totals |
|---|---|---|---|---|---|---|
| None (blank) | Surface | 61.2 | 6.3 | 8.2 | 29.4 | 105.1 |
| Do | Immersed | 1.2 | 4.2 | 1.4 | 3.1 | 9.9 |
| Hydrapulped | Surface | 36.1 | 9.8 | 2.0 | 5.7 | 53.6 |
| Do | Immersed | 6.4 | 1.0 | 1.8 | 5.4 | 14.6 |
| Totals | | 104.9 | 21.3 | 13.4 | 43.6 | |

NOTE.—TCXD concentration, 0.005% (based on slurry weight); Temperature, 100° C.; Time, 1 hour; Agitation, magnetic stirrer.

Related to the concept of agglomeration to produce "-heavying" is the process of adhering or attaching the contaminant particulates to macroscopic particles to produce a larger size particle of greater density. For example, particles of sand or a suitable ceramic of convenient size added to the pulp slurry under certain conditions, cause these more less neutral density contaminants to adhere and are subsequently centrifuged to the outer vortex in normal centricleaner operation. Most ceramic materials, including silica sand, exhibit a negative interfacial potential, as do most plastics, including paraffinic types. The charge on the latter can be altered by adding a cationic surfactant containing a hydrocarbon, e.g., hexadecyl or octadecyl, or chlorinated hydrocarbon, e.g., m-chlorobenzyl, residue on a nitrogen atom. The hydrocarbon or chlorinated hydrocarbon radical attaches itself to the plastic and the built-in positive charge of the nitrogen alters the overall potential of the plastic particle from negative to positive. The composite is then attracted to negative surfaces, such as those of silica sand or various ceramics. A series of eight tests shows the effect of this technique, among the effects of three other experimental variables. In each test 1 gram of polyethylene spherical particles, 74–125 microns in diameter and having a density of 0.88 gram/cc. is admixed with 5 grams of silica sand, 125–250 microns in diameter and deaerated under vacuum. A $10^{-4}$ molar amount of surfactant (octadecyltrimethyl ammonium chloride) is also present or not as indicated. table 2

TABLE 2.—POLYETHYLENE PRECIPITATED BY SILICA SAND

[Weight in grams]

| Time, minutes | Temperature, °C. | Agitation rate (r.p.m.) | | | |
|---|---|---|---|---|---|
| | | 200 | | 800 | |
| | | Surfactant concentration (molar) | | | |
| | | 0 | $10^{-4}$ | 0 | $10^{-4}$ |
| 5 | 30 | .04 | | | .17 |
| 5 | 80 | | .12 | .05 | |
| 50 | 30 | | .17 | .14 | |
| 50 | 80 | .04 | | | .13 | shows the grams of polyethylene which were carried to the bottom of the container by the silica and after 1 hour settling time. Analysis of variance shows the only significant conclusion (95–99 percent confidence level) to be that the additive does indeed foster attachment of the plastic to the sand.

Solids other than silica sand which are alternatively employed for precipitating plastic, polymeric, adhesive, rubbery and/or asphaltic contaminants found in reclaimed paper stock include ceramics, such as ground glass, corundum and any crystalline or vitreous metal oxide or mixture of refractory metal oxides. The overall particle size range of solids used for this purpose is from about 1 micron ($\mu$) to about 1 millimeter (mm.). A convenient particle size range is from about 44$\mu$ to about 250$\mu$. When such solids are so employed, the amount incorporated in pulp slurries ranges from traces to about 3 percent by weight, based on the weight of the pulp therein, but is preferably approximately equal in volume to the volume of contaminant present in the pulp slurry.

For best results and improved adherence to the noted contaminants, the solid particle surfaces are cleaned, e.g., by washing, calcining or grinding, so as to be free from extraneous organic matter or submicron dirt. The contaminant should also be contacted with a quaternary base, such as octadecyltrimethyl ammonium chloride, in an amount up to about 50 percent by weight of the contaminant, but preferably from 1 to 10 percent by weight thereof.

Some plastic, polymeric, adhesive, rubbery and/or asphaltic contaminants ordinarily appear with the "lighter" accepts even though they actually have specific gravities in excess of unity and clearly within the range of components expected to appear with the "heavier" rejects. The size and/or shape of these contaminants, however, increase their hydraulic drag sufficiently to make them act in the same manner as contaminants having lower specific gravities. By agglomerating or coupling such contaminant particles together, effective "-heavying" is achieved even when the coupling agent, e.g., kerosene, is actually lighter then both the contaminant and the medium. Such "coupling" agents produce a heavying effect irrespective of their specific gravity; their action, however, is limited to the noted special category of contaminants having densities greater than that of the medium. Such coupling agents are employed in minimal concentrations to avoid producing an overall "lightening" effect due to averaged density.

Defoaming agents and essentially nonpolar plasticizers (for the plastic, polymeric and/or rubbery contaminants) are useful as coupling agents.

Another form of coupling is achieved by the aforedescribed attachment of macroscopic solid particles to contaminant particulates. The macroscopic solid particles are ordinarily of sand or ceramic in finely divided form. They often "couple" with lighter plastic, polymeric, adhesive, rubbery and/or asphaltic contaminants even without the assistance of a liquid "coupling" agent. In fact, such macroscopic solid particles actually serve as coupling agents insofar as they attach to more than one particle of plastic, polymeric, adhesive, rubbery and/or asphaltic contaminant.

Coupling is thus the attachment of two or more particulates of the same or differing description by means of an agent, called a coupling agent, adsorbed or more particularly wetted onto or absorbed into one or more of the attached particles. The coupling agent causes adherence among particles through interfacial forces alone or in conjunction with viscous forces. Where wetting and absorption occur, what might otherwise be point contact is enlarged to an area contact. Interfacial tension increases by the corresponding increase in perimeter of the contact area. With the area increase goes an increase in viscous or plastic drag force which resists any relative motion tending toward separation.

In the aqueous medium of a pulp slurry the interfacial forces associated with hydrophobic or oleophilic contaminant particles cause the latter to tend to adhere once brought into contact with each other. Being little more than point attachments, these associations are readily broken by mechanical forces, such as are developed within a pulp slurry during processing, e.g., centricleaning.

Hydrophobic or oleophilic coupling agents which wet and/or absorb into these contaminants, broaden the area of contact, thus increasing the interfacial tensile force of adherence and providing increased viscous drag against any deformation of the attachment by external forces.

It is possible to bring about a marriage, with the same desired effects, between these same hydrophobic contaminants and hydrophilic moieties, such as oxide, ceramic, sand or glass particulates. These latter in aqueous media acquire a negative charge. A coupling agent having in its molecule a positive center, such as a quaternary ammonium group will, of course, strongly wet these negative surfaces. If an extensive oleophilic radical or group of radicals is also included in the molecule, the contaminant also will be wet and coupling between the latter and the hydrophilic ceramic achieved.

As used throughout the present application and claims, "reclaimed paper stock" is secondary fiber material prior to cleaning and/or deinking. Secondary fiber is fiber which has been previously used to make paper, cardboard, carton stock or fabric.

The following illustrative examples merely demonstrate the subject invention and are in no way limitative. In each example typical reclaimed defibered paper stock (pH≈13), having about 6 percent by weight (based on entire aqueous slurry weight) of uncontaminated fiber pulp, is agitated for 20 minutes (hydrapulping) at a temperature of about 85° C. (180° to 190° F.). Washing is then effected at room temperature until the pH is about neutral, the pulp solids being maintained at about 6 percent by weight. To form aqueous feed slurry for centricleaner centrifuging, the pulp solids are diluted to from 0.3 to 1 percent by weight, based on the total slurry weight. About 3 percent by weight (based on the weight of uncontaminated fiber) of plastic, polymeric, adhesive, rubbery and/or asphaltic contaminants with specific gravities ranging from slightly less than 0.96 to 1.1 are present in the aqueous feed slurry unless otherwise indicated. The centricleaner feed slurry, in indicated instances, contains a small amount of "heavying" agent.

Following hot agitation, the slurry is thus cooled and passed through a standard 3-inch centricleaner operated at an inlet pressure of 40 p.s.i.g. and arranged to give a slurry split of 80 percent by volume of accepts from the top exit port and 20 percent by volume of rejects from the bottom port. Under these conditions the pulp split by dry weight is 95 percent accepts to 5 percent rejects.

EXAMPLE 1

To the 6 percent slurry, prior to heating, add 0.05 weight percent (based on total slurry weight) of tetrachloro-o-xylene dichloride (TCXD) as "heavying" agent. After centrifugation, the accepts contain 1.0 weight percent of plastic, polymeric, adhesive, rubbery and/or asphaltic contaminants.

In the absence of any "heavying" additive, such as TCXD, the amount of plastic, polymeric, adhesive, rubbery and/or asphaltic contaminant found in the accepts is 2.6 percent by weight (same basis).

EXAMPLE 2

When, as in example 1, TCXD is added to the 6 percent slurry agitated at 85°, but in the amount of 0.01 percent by weight, the amount of plastic, polymeric, adhesive, rubbery and/or asphaltic contaminants in the accepts is 1.5 percent by weight.

EXAMPLE 3

Repeating example 1 with 0.5 weight percent (based on the initial slurry weight) of TCXD results in a contaminant level for the accepts of only 0.8 percent by weight based on the weight of the pulp.

EXAMPLE 4 a. Repeating example 1 with 1 percent (rather than about 3 percent) by weight of plastic, polymeric, adhesive, rubbery and/or asphaltic contaminants (based on the weight of the pulp) yields accepts with 0.2 weight percent of these contaminants.

b. Repeating example 2 with 1 percent (rather than about 3 percent) by weight of plastic, polymeric, adhesive, rubbery and/or asphaltic contaminants (based on the weight of the pulp) yields accepts with 0.25 weight percent of these contaminants. c. Repeating (b) with only 0.001 percent (rather than 0.01 percent) by weight of TCXD yields accepts with 0.4 weight percent of the noted contaminants.

EXAMPLE 5

Repeating example 4 without any "heavying" agent additive, such as the TCXD employed therein, yields accepts with 0.9 weight percent (based on the weight of the pulp) of the noted contaminants.

EXAMPLE 6

To initial 6 percent slurry containing 3 percent by weight of the noted contaminants add 0.05 weight percent (based on total slurry weight) of Arochlor 1260 as "heavying" agent. After centrifugation the accepts contain 1.5 weight percent (based on the weight of the pulp) of the plastic, polymeric, adhesive, rubbery and/or asphaltic contaminants.

EXAMPLE 7

Repeating example 6 with the same weight percent of orthodichlorobenzene (replacing the Arochlor 1260 as "heavying" agent) yields accepts with 1.7 weight percent (based on the weight of the pulp) of the noted contaminants.

EXAMPLE 8

Repeating example 6 with the same weight percent of monochlorobenzene (replacing the Arochlor 1260 as "heavying" agent) yields accepts with 1.8 weight percent (based on the weight of the pulp) of the noted contaminants. A similar effect is achieved when 0.05 weight percent of parachlorobenzonitrile is correspondingly employed as the sole "heavying" agent.

EXAMPLE 9

Repeating example 6 with the same weight percent of diphenylether (replacing the Arochlor 1260 as "heavying" agent) yields accepts with 2.2 weight percent (based on the weight of the pulp) of the noted contaminants. A similar effect is achieved when 0.05 weight percent of 1,1,2,2-tetrabromoethane is correspondingly employed as the sole "heavying" agent.

EXAMPLE 10

Repeating example 6 with the same weight percent of "Chlorowax 70" (replacing the Arochlor 1260 as "heavying" agent) yields accepts with 1.4 weight percent (based on the weight of the pulp) of the noted contaminants.

In examples 1 to 10 the plastic, polymeric, adhesive, rubbery and/or asphaltic contaminants are of the same nature and distribution as ordinarily found in typical reclaimed defibered paper stock.

EXAMPLE 11

Select a paper to be deinked which is devoid of any plastic, polymeric, adhesive, rubbery and/or asphaltic contaminants other than resins normally encountered in printing ink. Prepare therefrom a reclaimed defibered paper stock having about 6 percent by weight (based on the entire aqueous slurry weight) of uncontaminated fiber pulp. Shred and cut clear polyethylene and polypropylene sheets to produce pieces having a surface area of 1 square millimeter or less and admix these pieces with the defibered paper stock in the amount of 3 percent by weight based on the weight of the pulp. Repeating example 1 with the resultant contaminated pulp in place of that employed for example 1 yields accepts 1.1 weight percent (based on the weight of the pulp) of the noted incorporated contaminants. Treating identical pulp slurry in the same manner, but without the "heavying" agent (TCXD), yields accepts with 2.7 weight percent (based on the weight of the pulp) of said contaminants.

Moreover, pulp exposed to TCXD, as in the initial treatment described in example 11, is brighter than that which is not so exposed. Microscopic examination reveal that polyethylene and polypropylene particles taken from TCXD-treated stock are covered with fine specs of ink particulates, whereas polyethylene and polypropylene particles (taken from otherwise identical stock which undergoes the same treatment in the absence of "heavying" agent) are rarely spotted with ink particulates. Effects similar to that noted for TCXD are obtained with other "heavying" agents, e.g., Arochlor 1260 and orthodichlorobenzene.

The polyethylene and polypropylene particles act in a manner which essentially corresponds to that of the contaminants referred to in example 1.

EXAMPLE 12

Repeating example 6 with 0.005 weight percent (based on the weight of the slurry of octadecylterimethylammonium chloride and 1 weight percent (on the same basis) of clean silica sand (particle size from 250 to 1,250 microns) [added just before centrifuging]as a combination "heavying" agent (replacing the Arochlor 1260 ), yields accepts with 1.2 weight per cent (based on the weight of the pulp) of plastic, polymeric, adhesive, rubbery and/or asphaltic contaminants.

EXAMPLE 13

Repeating example 12 with 0.0001 weight percent (rather than 0.006 weight percent) of octadecyltrimethylammonium chloride yields accepts with 2 weight percent (based on the weight of the pulp) of the noted contaminants.

EXAMPLE 14

Repeating example 12 with 0.1 (rather than 0.005 ) weight percent (based on the slurry weight) of octadecyltrimethylammonium chloride and 0.1 (rather than 1 ) weight percent (on the same basis) of clean silica sand (particle diameter from 44 to 125 microns) yields accepts with 1.1 weight percent (based on the weight of the pulp) of the cited contaminants.

EXAMPLE 15

Adding 0.00001 weight percent of benzyltrimethylammonium nitrate and 0.1 weight percent of clean silica sand (particle diameter from 250 to 600 microns) to diluted (6 percent by weight slurry) stock just prior to passing the latter through the standard 3-inch centricleaner results in obtaining pulp accepts with 2.1 weight percent (based on the weight of the pulp) of the noted contaminants.

EXAMPLE 16 Repeating example 15 with 0.001 weight percent of metachlorobenzyltrimethylammonium bromide (replacing the 0.00001 weight percent of benzyltrimethylammonium nitrate) and 0.1 weight percent of clean silica sand having mean particle diameters from 44 to 600 microns (replacing the silica sand of example 15 yields pulp accepts with 1.3 weight percent (based on the weight of the pulp) of the noted contaminants. Similar results are obtained by substituting the same weight percent of dibenzyldiethyl ammonium chloride for the metachlorobenzyltrimethylammonium bromide.

The invention and its advantages are readily understood from the foregoing description. As various changes can be readily made in the process without departing from the spirit and scope of the invention or sacrificing its material advantages, it is recognized that the process hereinbefore described is merely illustrative of preferred embodiments of the invention.

We claim:

1. In centrifugal cleaning of aqueous slurry in a conical cleaner having a tangential inlet feed, a base and an apex, and from which rejects are discharged from the apex with heavier components and accepts are discharged from an axial outlet in the base with lighter components, the improvement wherein at least one member selected from the group consisting of liquid additive and particulate solid additive, which is selectively attracted to contaminants normally discharged from the axial outlet in the base and effectively makes such contaminants heavier, is incorporated in the feed in an mount sufficient to make a proportion of the contaminants effectively heavier and to discharge from the apex.

2. A process according to claim 1 wherein the aqueous slurry is that of reclaimed paper stock.

3. In centrifugal cleaning of aqueous slurry in a conical cleaner having a tangential inlet feed, a base and an apex, and from which rejects are discharged from the apex with heavier components and accepts are discharged from an axial outlet in the base with lighter components and some heavy contaminants, the imprqvement wherein liquid or particulate solid additive, which is selectively attracted to heavy contaminants normally discharged from the axial outlet in the base, is incorporated in the feed, whereby a proportion of the heavy contaminants is effectively made heavier and removed from the apex, the additive being one which effectively makes said contaminants heavier.

4. A process according to claim 3 wherein the aqueous slurry is that of reclaimed paper stock.

5. A process according to claim 4 wherein the contaminants are organic in nature and said additive comprises solid form additive.

6. A process according to claim 5 wherein the solid form additive is silica sand.

7. A process according to claim 4 wherein the contaminants are organic in nature and said additive is organic, oleophilic and in liquid form.

8. A process according to claim 7 wherein said liquid has a specific gravity less than that of water.

9. A process according to claim 7 wherein said liquid has a specific gravity of about 1.0.

10. A process according to claim 7 wherein said liquid has a specific gravity greater than 1.0 and less than that of the heavy contaminants.

11. A process according to claim 7 wherein said liquid has a specific gravity of at least that of the heavy contaminants.

12. A process according to claim 4 wherein the heavy contaminants are organic in nature and the additive comprises both solids and liquid.

13. A process according to claim 12 wherein the heavy contaminants have specific gravities ranging from slightly less than 0.96 to 1.1, and are essentially of plastic, polymeric, adhesive, rubbery or asphaltic material.

14. In a centrifugal cleaner feed of aqueous reclaimed paper stock slurry which contains an additive and at least one contaminant normally discharged with light accepts, the improvement wherein the additive is one which effectively increases the specific gravity of the contaminant sufficiently to enable said contaminant to be discharged with heavy rejects.

15. A slurry according to claim 14 which contains from 5 p.p.m. to 100 p.p.m., by weight, of the additive.

* * * * *

PO-1050
(5/69)

UNITED STATES PATENT OFFICE
CERTIFICATE OF CORRECTION

Patent No. 3,635,788                    Dated January 18, 1972

Inventor(s) HARRY J. BRAUN and STANLEY A. DUNN

It is certified that error appears in the above-identified patent and that said Letters Patent are hereby corrected as shown below:

Covering page, left column, line 5, "Carolina" should read
--Caroline--; immediately below line 9, "[21] Appl. No.: 108,834"
insert --[73] Assignee: Bergstrom Paper Company
                        a Corporation of Wisconsin--. Column 1,
immediately below line 3, "HEAVYING" insert:

--FIELD OF INVENTION

Paper Making and Fiber Liberation, Waste Papers or Textile Waste, with organic agent.--; lines 13 to 15, "PRIOR ART In ... deinked" should read

--PRIOR ART

In normal de-inking and cleaning of reclaimed paper stock, after the raw material has been de-fibered and de-inked--; line 41, "twofold" should read --two-fold--; line 63, "a "-" should read --a--; line 64, "heavying" " should read --"heavying"--. Column 2, line 50, " "Heavying" " should start a new paragraph. Column 3, line 32, "lever" should read --level--; line 50, "lever" should read --level--. Column 4, line 29, "poly" should read --polar--; line 54, "Δ-" should read --γ- --; line 63, "heaving ... e.g.," should read --heavying agents can also be hydrocarbons, e.g.--; line 64, "then ... e.g.," should read --they can be mononuclear, e.g.--; line 65, "e.g.," should read --e.g.--; line 67, "e.g.," should read --e.g.--; line 71, "e.g., ... of" should read --e.g. 2,3,4-trichlorofuran, or--; line 72, "e.g.," should read --e.g.--. Column 6, line 11, "e.g.," should read --e.g.--; line 12, "these" should read --those--; line 16, "material" should read --materials,--; lines 24, 26, 28 and 30, "trade name" should read --tradename--; line 29, "CB&Q)" should read --Cl$_7$)--; line 31, "CB&LK) should read --Cl$_{21}$); line 32, "1,2,2-tetrabromo-ethane" should read --1,2,3-trichloropropane--; immediately below line 32, insert --1,1,2,2-tetrabromoethane--. Column 7, line 15, "produce "-" should read --produce--; line 16, "heavying" " should read --"heavying"--; line 56, "and" should read --sand--; line 74, "e.g.," should read --e.g.--. Column 8, line 28,

UNITED STATES PATENT OFFICE
CERTIFICATE OF CORRECTION

Patent No. 3,635,788      Dated January 18, 1972

Inventor(s) HARRY J. BRAUN and STANLEY A. DUNN

It is certified that error appears in the above-identified patent and that said Letters Patent are hereby corrected as shown below:

"effective "-" should read --effective--; line 29, "heavying" " should read --"heavying"--; "e.g.," should read --e.g.--. Column 10, line 8, "c. Repeating" should start a new paragraph; line 29, "as "-" should read --as--; line 30, "heavying" " should read --"heavying"--; line 49, "sole "-" should read --sole--; line 50, "heavying" " should read --"heavying"--. Column 11, line 8, "reveal" should read --reveals--; line 24, "octadecylterimethylammonium" should read --octadecyltrimethylammonium--; line 27, "]as" should read --], as--; line 35, "0.006" should read --0.005--; line 57, "EXAMPLE 16 Repeating ... weight" should read:

--EXAMPLE 16

Repeating example 15 with 0.001 weight--; line 62, "15 yields" should read --15) yields--; line 64, ".Similar" should read --. Similar--. Column 12, claim 1, line 10, "an mount" should read --an amount--.

Signed and sealed this 13th day of November 1973.

(SEAL)
Attest:

EDWARD M. FLETCHER, JR.
Attesting Officer

RENE D. TEGTMEYER
Acting Commissioner of Patents